US007111051B2

(12) United States Patent
Nobakht et al.

(10) Patent No.: US 7,111,051 B2
(45) Date of Patent: Sep. 19, 2006

(54) SMART CARD FOR ACCESSING A TARGET INTERNET SITE

(75) Inventors: Lida Nobakht, Campbell, CA (US); James R. W. Clymer, Mountain View, CA (US)

(73) Assignee: VIACLIX, Inc., Campbell, CA (US)

( * ) Notice: Subject to any disclaimer, the term of this patent is extended or adjusted under 35 U.S.C. 154(b) by 543 days.

(21) Appl. No.: 09/828,294

(22) Filed: Apr. 6, 2001

(65) Prior Publication Data

US 2001/0039583 A1    Nov. 8, 2001

Related U.S. Application Data

(63) Continuation-in-part of application No. 09/491,681, filed on Jan. 26, 2000, and a continuation-in-part of application No. 09/491,458, filed on Jan. 26, 2000, now Pat. No. 6,745,223, and a continuation-in-part of application No. 09/491,436, filed on Jan. 26, 2000, now Pat. No. 6,587,873.

(51) Int. Cl.
*G06F 15/16* (2006.01)
*G06F 15/173* (2006.01)

(52) U.S. Cl. ............... 709/217; 709/219; 709/229; 709/223

(58) Field of Classification Search .......... 709/212, 709/213–219, 223, 224, 225, 238, 227–229
See application file for complete search history.

(56) References Cited

U.S. PATENT DOCUMENTS

| 5,590,199 | A | * | 12/1996 | Krajewski et al. .......... 713/159 |
| 5,694,473 | A | | 12/1997 | Bright et al. |
| 5,734,589 | A | | 3/1998 | Kostreski et al. |
| 5,818,935 | A | | 10/1998 | Maa |
| 5,895,462 | A | | 4/1999 | Toki |
| 5,895,471 | A | | 4/1999 | King et al. |
| 5,987,612 | A | | 11/1999 | Takagawa et al. |
| 5,995,965 | A | * | 11/1999 | Experton .................. 707/10 |
| 6,002,394 | A | | 12/1999 | Schein et al. |

(Continued)

FOREIGN PATENT DOCUMENTS

DE    19811910    9/1998

(Continued)

OTHER PUBLICATIONS

"Slinky: A Url Server", Vogele et al; Proceedings of the Annual Conf. on Emerging Technologies etc., Aug. 1996, pp. 120-123.

(Continued)

*Primary Examiner*—Ario Etienne
*Assistant Examiner*—Hussein Elchanti
(74) *Attorney, Agent, or Firm*—Bever, Hoffman & Harms, LLP; Patrick T. Bever

(57) ABSTRACT

A server is established for a plurality of authorized users. Each authorized user accesses the Internet through a user terminal, with support from the server. The server maintains a database identifying the authorized users. A target Internet site provides payment and a target URL to the server. In return, the server has smart cards created, each storing information identifying an authorized user and the target URL. These smart cards are sent to the corresponding authorized users. Upon insertion of a smart card, a user terminal retrieves the authorized user information and transmits this information to the server. The server compares this information with authorized user information in the server database. If a match exists, the server transmits an authorization code to the user terminal. In response, the user terminal retrieves the target URL from the smart card, and uses this URL to retrieve information from the target Internet site.

11 Claims, 7 Drawing Sheets

U.S. PATENT DOCUMENTS

| | | |
|---|---|---|
| 6,018,768 A | 1/2000 | Ullman et al. |
| 6,025,837 A | 2/2000 | Matthews, III et al. |
| 6,044,349 A * | 3/2000 | Tolopka et al. ............... 705/1 |
| 6,061,719 A | 5/2000 | Bendinelli et al. |
| 6,073,171 A | 6/2000 | Gaughan et al. |
| 6,105,008 A * | 8/2000 | Davis et al. ................. 705/41 |
| 6,154,205 A | 11/2000 | Carroll et al. |
| 6,163,316 A | 12/2000 | Killian |
| 6,195,692 B1 | 2/2001 | Hsu |
| 6,199,114 B1 | 3/2001 | White et al. |
| 6,226,744 B1* | 5/2001 | Murphy et al. ................ 726/5 |
| 6,229,532 B1 | 5/2001 | Fujii |
| 6,263,501 B1 | 7/2001 | Schein et al. |
| 6,275,989 B1 | 8/2001 | Broadwin et al. |
| 6,317,885 B1 | 11/2001 | Fries |
| 6,330,595 B1 | 12/2001 | Ullman et al. |
| 6,338,094 B1 | 1/2002 | Scott et al. |
| 6,349,410 B1 | 2/2002 | Lortz |
| 6,381,748 B1 | 4/2002 | Lin et al. |
| 6,385,729 B1* | 5/2002 | DiGiorgio et al. .......... 713/201 |
| 6,397,387 B1 | 5/2002 | Rosin et al. |
| 6,400,407 B1 | 6/2002 | Zigmond et al. |
| 6,438,751 B1 | 8/2002 | Voyticky et al. |
| 6,466,981 B1 | 10/2002 | Levy |
| 6,490,358 B1* | 12/2002 | Geer et al. ................. 380/286 |
| 6,510,557 B1 | 1/2003 | Thrift |
| 6,598,032 B1 | 7/2003 | Challener et al. |
| 6,615,264 B1* | 9/2003 | Stoltz et al. ................ 709/227 |
| 6,615,353 B1* | 9/2003 | Hashiguchi ................. 713/185 |
| 6,738,901 B1* | 5/2004 | Boyles et al. ............... 713/159 |
| 6,745,247 B1* | 6/2004 | Kawan et al. .............. 709/245 |
| 6,748,532 B1* | 6/2004 | Digiorgio et al. ........... 713/159 |
| 6,802,007 B1* | 10/2004 | Canelones et al. .......... 713/193 |
| 6,854,009 B1* | 2/2005 | Hughes ....................... 709/220 |
| 6,934,841 B1* | 8/2005 | Boyles et al. ............... 713/159 |
| 6,941,285 B1* | 9/2005 | Sarcanin ...................... 705/67 |
| 6,983,485 B1* | 1/2006 | Offer .............................. 726/4 |
| 2002/0010941 A1 | 1/2002 | Johnson |
| 2002/0026642 A1 | 2/2002 | Augenbraun et al. |
| 2003/0093807 A1 | 5/2003 | Nguyen |
| 2003/0154492 A1 | 8/2003 | Falvo et al. |

FOREIGN PATENT DOCUMENTS

| | | |
|---|---|---|
| EP | 0963119 A1 | 12/1999 |
| FR | 2760159 A1 | 8/1998 |
| WO | WO 97-49044 | 12/1997 |
| WO | WO 98/56188 | 12/1998 |
| WO | WO 99-35843 | 7/1999 |
| WO | WO 99/57905 | 11/1999 |
| WO | WO 99/63759 | 12/1999 |
| WO | WO 00/49505 A1 | 8/2000 |

OTHER PUBLICATIONS

"Internet Over Direct Broadcast Satellites", Clausen et al., IEEE Communications Mag, vol. 37, No. 6, Jun. 1999, pp. 146-151.

"Internet-TV—Konvergenz Von Diensten und Geraeten?", Fernseh und Kinotechnik, Vde Verlag GMBH. Berlin, DE>, vol. 52, No. 1/2, Jan. 1998, pp. 58-62 & 64.

"A Cryptographically Secure EW Database With Selective Random Access", Ikram et al., 1997 IEEE, pp. 1407-1411.

Consumer Electronics, Jan. 1997, pp. 43-48 (author unknown).

* cited by examiner

NETWORK DATABASE 416

| USER PIN | BOX SERIAL NO. | USER STATUS | CUSTOMER NO. |
|---|---|---|---|
| 001 (JOHN DOE) | 00000001 | CURRENT | 123456789 (DOE FAMILY) |
| 002 (JANE DOE) | 00000001 | CURRENT | 123456789 (DOE FAMILY) |
| 003 (CHILD DOE) | 00000001 | CURRENT | 123456789 (DOE FAMILY) |
| 001 (DAN DELAY) | 00000002 | EXPIRED | 987654321 (DELAYFAMILY) |

FIG. 5

SMART CARD FOR ACCESSING A TARGET INTERNET SITE

RELATED APPLICATIONS

The present invention is a continuation-in-part of U.S. patent application Ser. No. 09/491,681 entitled "Channel-Based Internet Network", Ser. No. 09/491,458 now U.S. Pat. No. 6,745,223 entitled "User Terminal For Channel-Based Internet Network" and Ser. No. 09/491,436 now U.S. Pat. No. 6,587,873 entitled "System Server For Channel-Based Internet Network", all of which having been filed concurrently on Jan. 26, 2000 and each of which is incorporated by reference in its entirety.

FIELD OF THE INVENTION

The present invention relates to telecommunications, and more particularly to networks and systems used to access the Internet.

RELATED ART

The Internet is a modern communication system that allows computer operators (users) to network with other operators as well as a variety of Internet databases (sites). These Internet sites often provide useful information, such as news and weather information, or offer products or services that can be purchased by users using, for example, credit card numbers. Many vendors have established an Internet site with the desire that many users access the site and purchase products or services from the vendors through the site. However, vendors typically face significant hurdles in attracting users to their Internet sites.

First, a prospective user must purchase an expensive personal computer and appropriate software. Next, the prospective user must establish an account with an Internet access provider or on-line service provider such as America Online. The prospective user must master the operating system of the personal computer to establish access to the Internet.

After establishing access to the Internet, the user must memorize and enter a long and confusing uniform resource locator (URL) associated with the vendor's Internet site. In order for this to occur, the user must be made aware of the URL. This typically requires the vendor to spend a significant amount of money advertising the URL associated with the Internet site. This advertising is typically in the form of television, radio or on-line advertisements.

It would therefore be desirable to have a more efficient and direct method for enabling vendors to attract users to their Internet sites.

SUMMARY

The present invention is directed to an Internet network that includes a system server, a user terminal having a smart card interface, and a target Internet site, all coupled to the Internet.

A system server is established for a plurality of authorized users. Each of the authorized users accesses the Internet with support from the system server through a user terminal. The system server maintains a server database that stores authorized user information corresponding with each of the authorized users. For example, the server database may store a customer number and personal ID number for each of the authorized users.

In a particular embodiment, an owner of the target Internet site would like to provide target information to one or more of the authorized users. For example, the target information may take the form of a web page that is accessed from the target Internet site in response to a target URL. The owner of the target Internet site provides payment to the owner of the system server to obtain the ability to provide the target information to the authorized users. In return, the owner of the system server has smart cards programmed and sent to the authorized users. Each of these smart cards is programmed to store the authorized user information of a corresponding authorized user and the target URL specified by the owner of the target Internet site. Each of the smart cards is sent (e.g., mailed) to the corresponding authorized user. When an authorized user inserts his or her smart card into a user terminal, the user terminal retrieves the authorized user information from the smart card, and transmits this information to the system server via the Internet. The system server compares the authorized user information received from the user terminal with the authorized user information stored in the server database. If a match exists, the system server transmits an authorization code to the user terminal. In response to the authorization code, the user terminal retrieves the target URL from the smart card, and uses the target URL to access the target Internet site. In response, the target Internet site provides the target information to the user terminal.

As a result, the target Internet site is able to provide target information to the authorized users, without having to advertise the URL associated with the target information. By requiring the authorization code to access the target URL, the owner of the system server prevents the owner of the target Internet site from simply creating its own smart cards to avoid payment to the owner of the system server.

In another embodiment, the owner of the system server may collect personal information from the authorized users (e.g., age, gender, income level, and hobbies). The owner of the system server can then provide smart cards to a selected subset of the authorized users. For example, the owner of the system server could provide smart cards that provide information on automobiles only to those authorized users old enough to drive, or provide information on golf clubs only to those authorized users that list golf as a hobby. As a result, the owner of the target Internet site is able to provide the target information to a desirable audience.

The present invention will be more fully understood in view of the following description and drawings.

BRIEF DESCRIPTION OF THE DRAWINGS

FIG. 5 is a diagram depicting the data stored in a network database of the system server in accordance with a simplified embodiment of the present invention;

DETAILED DESCRIPTION

Figure 1:
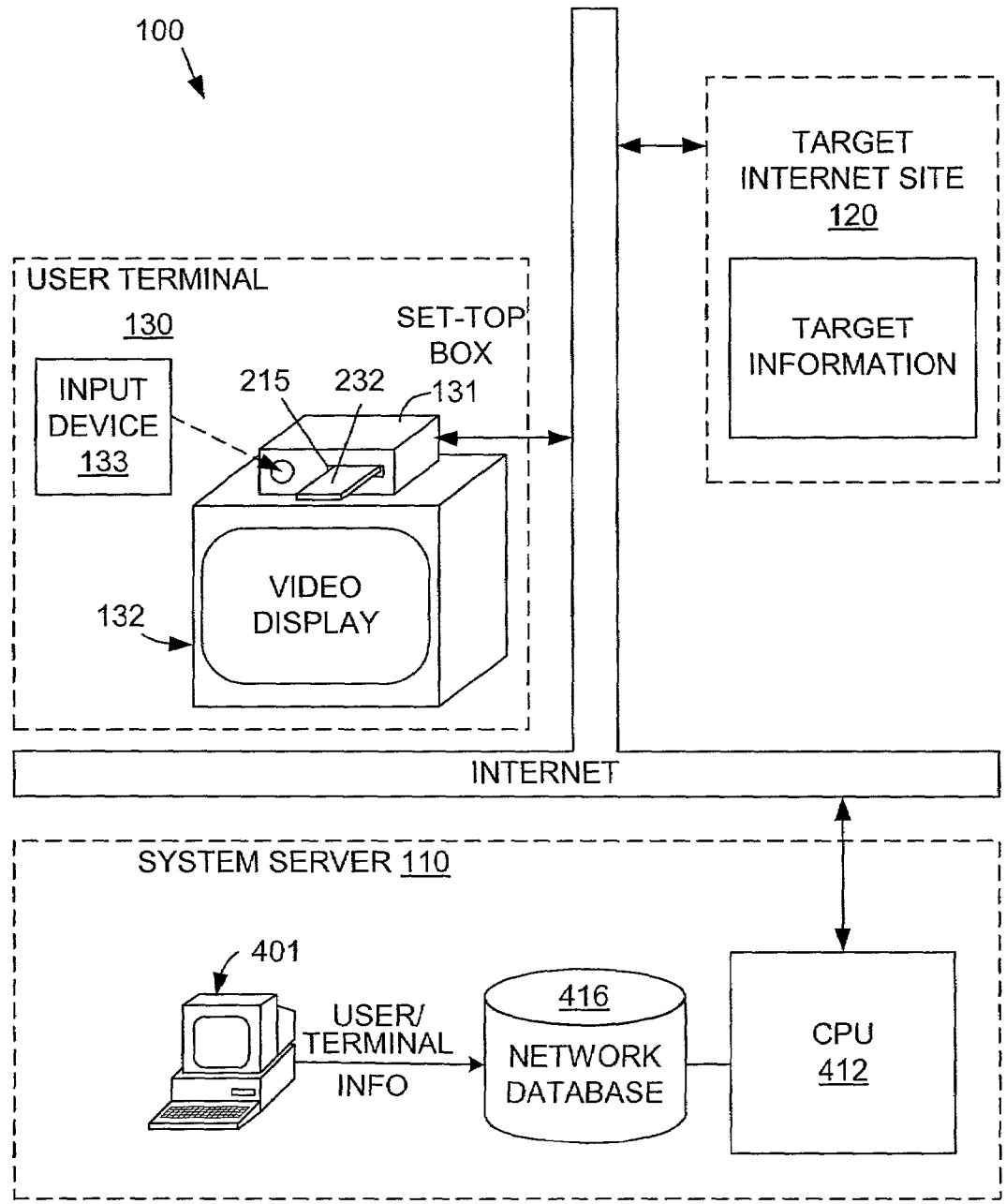
FIG. 1 is a block diagram showing a portion of an Internet network in accordance with one embodiment of the present invention.

FIG. 1 shows a portion of an Internet network 100 according to one embodiment of the present invention. Internet network 100 includes a system server 110, Internet site 120, and user terminal 130. System server 110 includes input terminal 401, network database 416 and CPU 412. User terminal 130 includes set-top box 131, video display 132 and input device 133. System server 110, Internet site 120 and user terminal 130 are connected to the Internet using known communication hardware and methods. These elements are described in more detail in commonly owned, co-pending U.S. patent application Ser. No. 09/491,681 entitled "Channel-Based Internet Network", Ser. No. 09/491,458 entitled "User Terminal For Channel-Based Internet Network" and Ser. No. 09/491,436 entitled "System Server For Channel-Based Internet Network", each of which is incorporated by reference in its entirety.

The present invention provides an additional application for the networks described in U.S. patent application Ser. Nos. 09/491,681, 09/491,458 and 09/491,436. In accordance with one embodiment, the additional application provided to Internet network 100 can be generally described as follows. The owner of target Internet site 120 is an entity, such as a merchant, who would like to display target information, such as an advertisement, to the owner of user terminal 130 in the form of a web page. To facilitate this, the owner of system server 110 provides a smart card 232 to the owner of user terminal 130 in exchange for payment from the owner of target Internet site 120. Smart card 232 is programmed to store authorized user information identifying the owner of user terminal 130, and a predetermined URL, which is specified by the owner of target Internet site 120.

When the owner of user terminal 130 inserts smart card 232 into smart card slot 215 of set-top box 131, an initialization process is started. During this process, set-top box 131 retrieves the authorized user information stored on smart card 232, and transmits this information to system server 110. If system server 110 determines that the user authorization information is valid, then system server 110 transmits an authorization code to set-top box 131. In response to the authorization code, set-top box 131 retrieves the target URL stored on smart card 232. (Set-top box 131 is not able to retrieve the target URL without the authorization code.) Set-top box uses the retrieved target URL to access the target Internet site. In response, target Internet site 120 transmits the target information (i.e., a web page) to set-top box 131. Set-top box 131, in turn, displays the downloaded target information on video display 132. In this manner, the target information is automatically provided to user terminal 130 without the user having to know or enter the target URL associated with the target Internet site.

The operation of network 100 will now be described in more detail.

Figure 2:
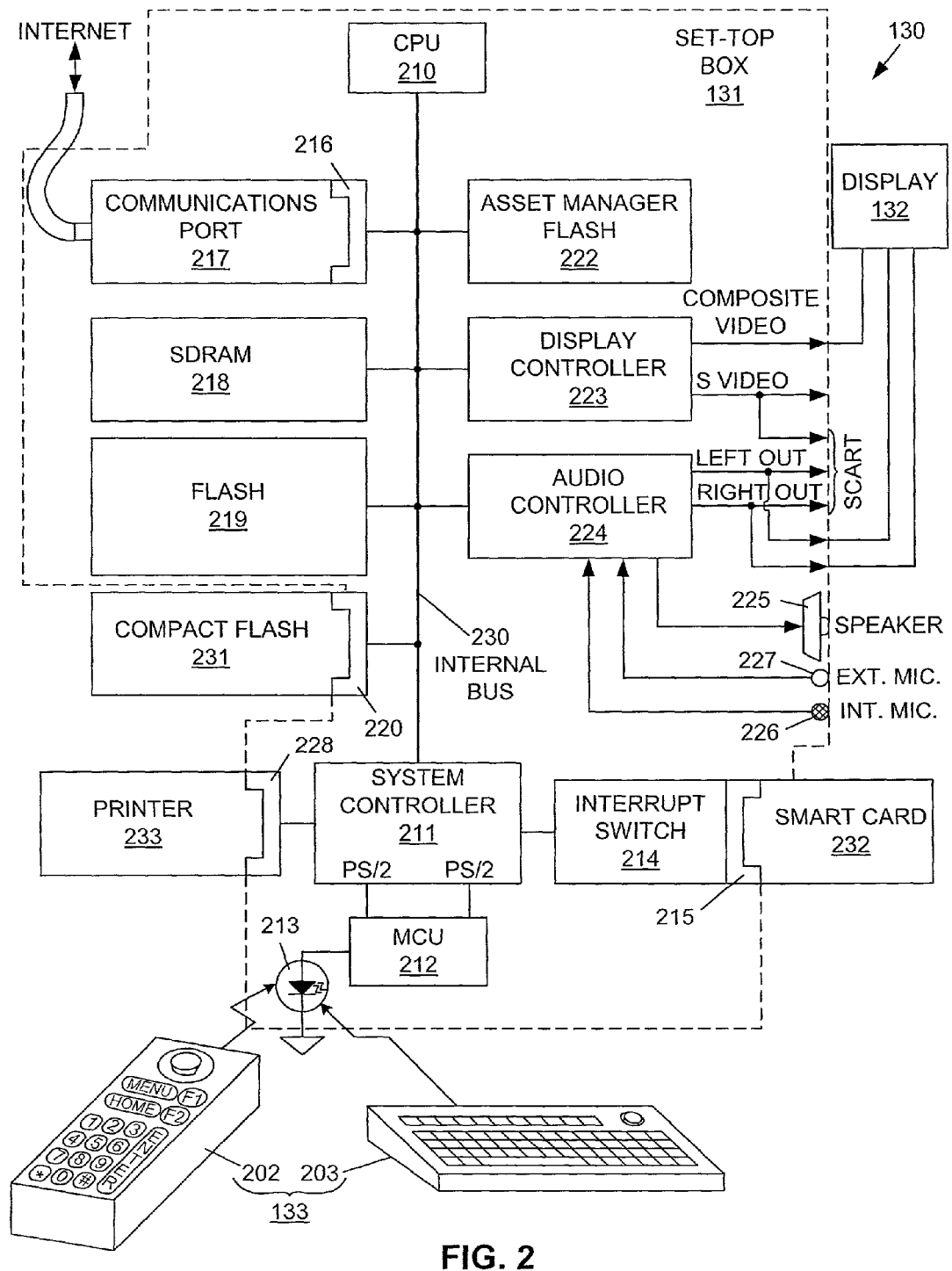
FIG. 2 is a block diagram showing the user terminal of the Internet network of FIG. 1 in accordance with one embodiment of the present invention.

FIG. 2 is a block diagram showing user terminal 130 in accordance with one embodiment of the present invention. In the embodiment shown in FIG. 2, input device 133 can be a remote control 202 and/or a wireless keyboard 203.

Set-top box 131 includes central processing unit (CPU) 210, system controller 211, micro-controller unit (MCU) 212, IR receiver 213, interrupt switch 214, smart card socket 215, communications port socket 216, communication port 217, synchronous dynamic random access memory (SDRAM) 218, dedicated flash memory 219, compact flash socket 220, asset manager flash memory 222, display controller 223, audio controller 224, speaker 225, internal microphone 226, external microphone jack 227 and parallel port socket 228. The various elements are connected by an internal bus 230 as illustrated. A compact flash card 231 is selectively insertable into compact flash socket 220, and a printer 233 is selectively connected to parallel port socket 228. In addition, a smart card 232 is selectively insertable into smart card socket 215. The various elements of set-top box 131 are described in detail on commonly owned, co-pending U.S. patent application Ser. Nos. 09/491,681, 09/491,458 and 09/491,436. CPU 210 and system controller 211 support a smart card access protocol. Smart card 232 is inserted into smart card socket 215, thereby providing a connection between smart card 232 and system controller 211. Interrupt switch 214 generates an interrupt signal each time that a smart card is inserted or removed from smart card socket 215.

Figure 3:
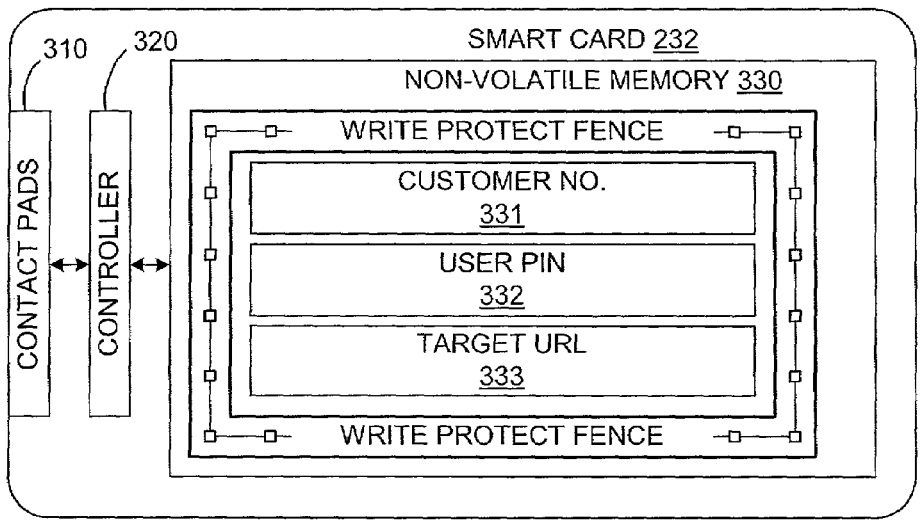
FIG. 3 is a block diagram of a smart card associated with the user terminal shown in FIG. 2.

FIG. 3 is a block diagram illustrating smart card 232 in accordance with one embodiment of the present invention. Smart card 232 includes a set of contact pads 310 that are placed into contact with socket 215 (see FIG. 2), and a controller 320 for preventing unauthorized reading from and/or writing to a non-volatile memory 330. Nonvolatile memory 330 stores limited-write data that is protected by a write protect fence.

The limited-write data, which is located within the write protect fence in FIG. 3, includes a customer number 331, a personal identification number (user PIN) 332, and a target Internet site URL 333. In the described embodiment, smart card 232 is inserted in set-top box 131 after the user has established a connection between set-top box 131 and the Internet. This connection can be established using a smart card in the manner described in U.S. patent application Ser. Nos. 09/491,681, 09/491,458 and 09/491,436. In another embodiment, smart card 232 can additionally include the information required to establish the connection to the Internet.

In the described example, customer number 331 is a number (e.g., "123456789") that identifies a customer group, such as the Doe family, and user PIN 332 is a number (e.g., "001") that identifies one member of the customer group, such as John Doe. As discussed below, the customer number 331 and user PIN 332 are associated with a box serial number stored in asset manager flash 222. Target Internet site URL 333 is the Internet address of the site that provides the target information. An authorization code is required to retrieve target Internet site URL 333 from smart card 232. In the described embodiment, the target Internet site URL 333 is "www.store.com/specialoffer".

Figure 4:
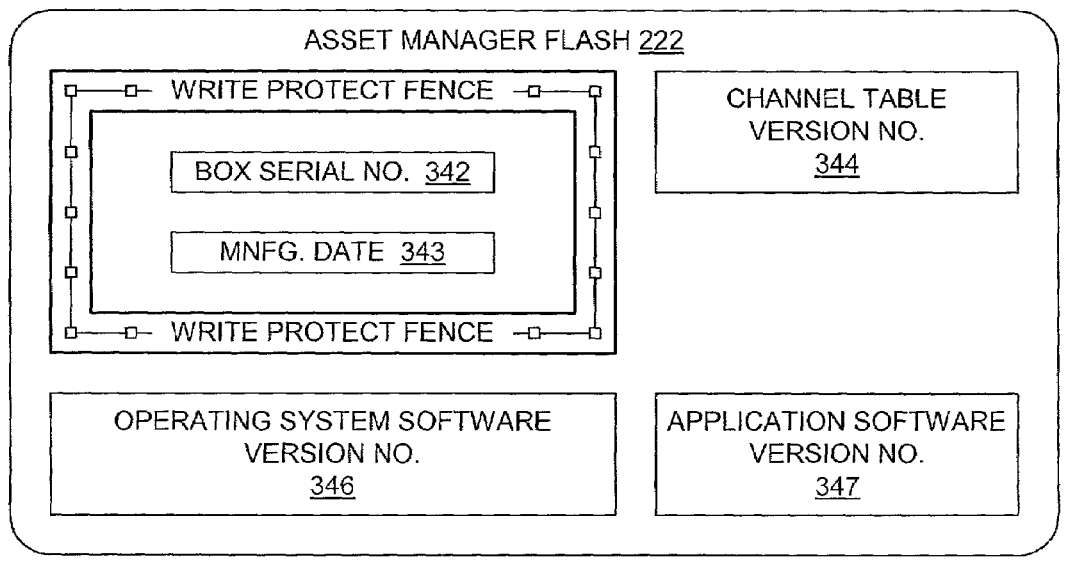
FIG. 4 is a block diagram of an asset manager flash associated with the user terminal shown in FIG. 2.

FIG. 4 is a block diagram illustrating an example of the data stored in asset manager flash 222. Asset manager flash 222 is a non-volatile memory that is permanently connected to internal bus 230. Asset manager flash 222 permanently stores information that identifies set-top box 131, such as box serial number 342. In the described example, the box serial number 342 stored in asset manager flash 222 is equal to "00000001". Asset manager flash 222 also stores manufacture date 343, current channel table version 344, operating system version numbers 346 and application software version numbers 347, which are not relevant to the present invention. The information stored in asset manager flash 222 is described in more detail in U.S. patent application Ser. Nos. 09/491,681, 09/491,458 and 09/491,436.

Referring now to FIG. 1, system server 110 includes an input terminal 401 (e.g., a personal computer or workstation), a CPU 412 and a network database 416. The hardware components of system server 110, both shown and not shown, are conventional and well known to those of ordinary skill in the art. Input terminal 401 is used by the owner of server 110 to enter user/terminal information into network database 416 using known data processing techniques. Network database 416 stores user and terminal information used to identify and authorize users that request service.

FIG. 5 is a diagram depicting the data stored in network database 416 in accordance with a simplified embodiment of the present invention. Network database 416 stores user PINs, set-top box serial numbers, user status and customer numbers. In the described example, the first entry of network database 416 corresponds with user John Doe. Thus, the first entry of network database 416 stores user PIN "001", box serial number "00000001" and customer number "123456789". User status information is used to determine whether a user is currently authorized to access the network. The status of the Doe family is "current". However, user "DAN DELAY" is indicated as having an "expired" account due to late payment of user fees or misconduct. The owner of system server 110 programs network database 416 to store information for all users of network 100. Note that users will typically become registered in network database 416 when signing up for the channel-based Internet access described in U.S. patent application Ser. Nos. 09/491,681, 09/491,458 and 09/491,436.

Figure 6:
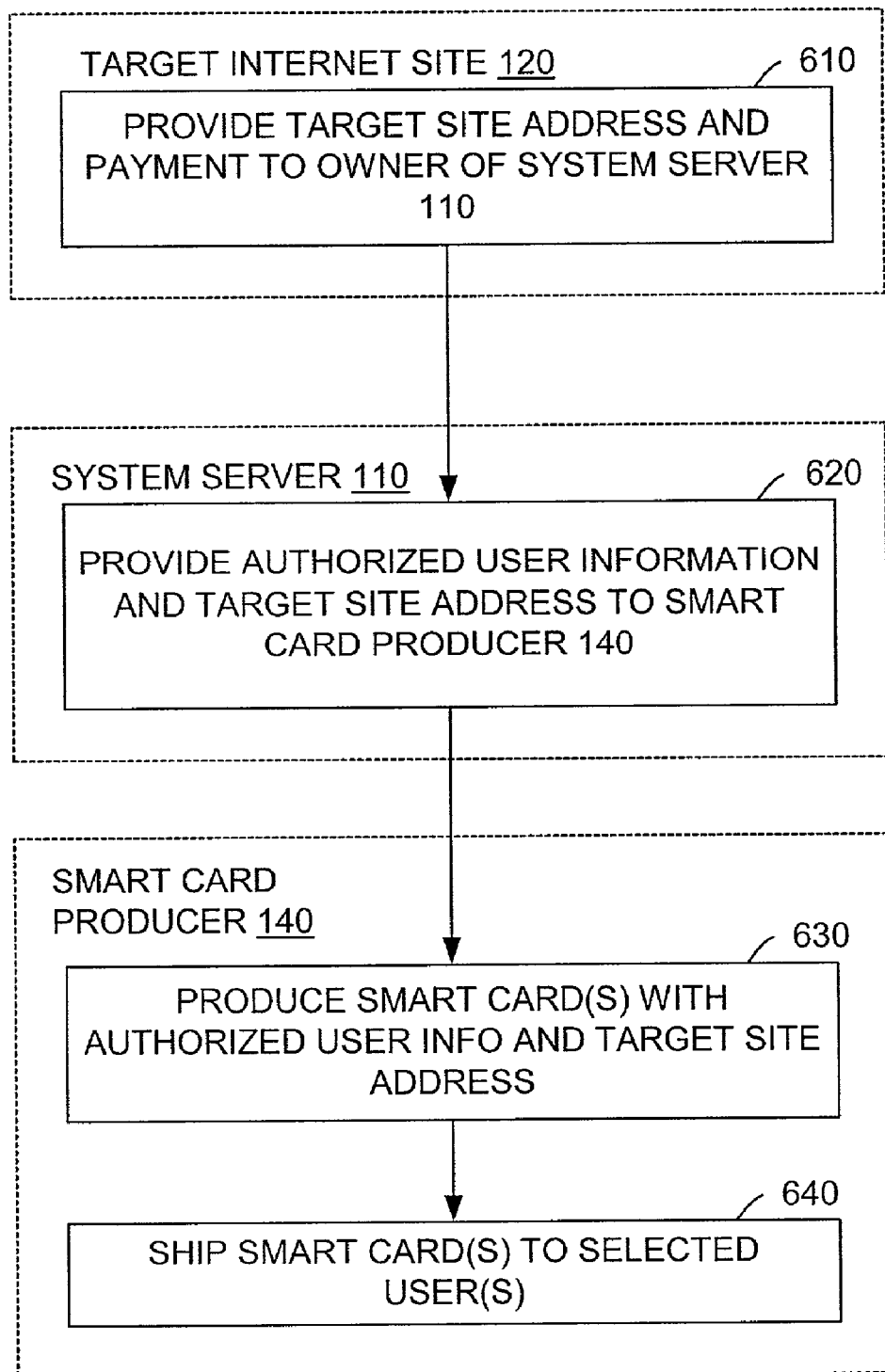
FIG. 6 is a diagram illustrating the flow of information between a system server, a target Internet site, and a smart card producer in accordance with one embodiment of the present invention.

FIG. 6 is a diagram illustrating the flow of information between system server 110, target Internet site 120, and a smart card producer 140 in accordance with one embodiment of the present invention.

First, the owner of target Internet site 120 provides the desired target Internet site URL (e.g., "www.store.com/specialoffer") and an agreed upon payment to the owner of system server 110 (Step 610). In response, the owner of system server 110 provides the target Internet site URL and authorized user information (e.g., customer number and user PIN) for an agreed upon set of one or more users to a smart card producer 140 (Step 620). For each user in the agreed upon set, smart card producer 140 produces a corresponding smart card that stores the target Internet site URL, the user's corresponding customer number and the user's corresponding user PIN (Step 630).

The smart card producer 140 can be the same entity as the owner of system server 110, or an entity hired by the owner of system server 110. If the smart card producer 140 is hired by the owner of system server 110, then the owner or system server 110 may insist on an agreement that prohibits the smart card producer 140 from disclosing the authorized user information received from the owner of system server 110.

The authorized user information provided by the owner of system server 110 is an item negotiated with the owner of target Internet site 120. For example, the owner of target Internet site 120 can negotiate to have smart cards prepared for all of the authorized users of system server 110. Alternatively, the owner of target Internet site 120 can negotiate to have smart cards prepared for only selected groups of authorized users. For example, the owner of target Internet site 120 may specify that smart cards are only to be prepared for female users of system server 110 over the age of 18. The owner of target Internet site 120 can limit the users receiving smart cards using other criteria, including, but not limited to, annual income, particular interest groups or geographic location. The owner of system server 110 may obtain the various selection criteria from the users when the users sign-up for service with system server 110. This will typically occur when the users sign-up for the channel-based network service described in U.S. patent application Ser. Nos. 09/491,681, 09/491,458 and 09/491,436. During this sign-up process, the user may be provided the option of not receiving smart cards from target Internet sites.

The programmed smart cards are shipped to the selected users (Step 640). Note that the owner of system server 110 will have received the user's addresses during the sign-up process. In the described example, a smart card is created for John Doe, which stores customer number "123456789", user PIN "001" and the URL for target Internet 120, namely, "www.store.com/specialoffer".

Figure 7:
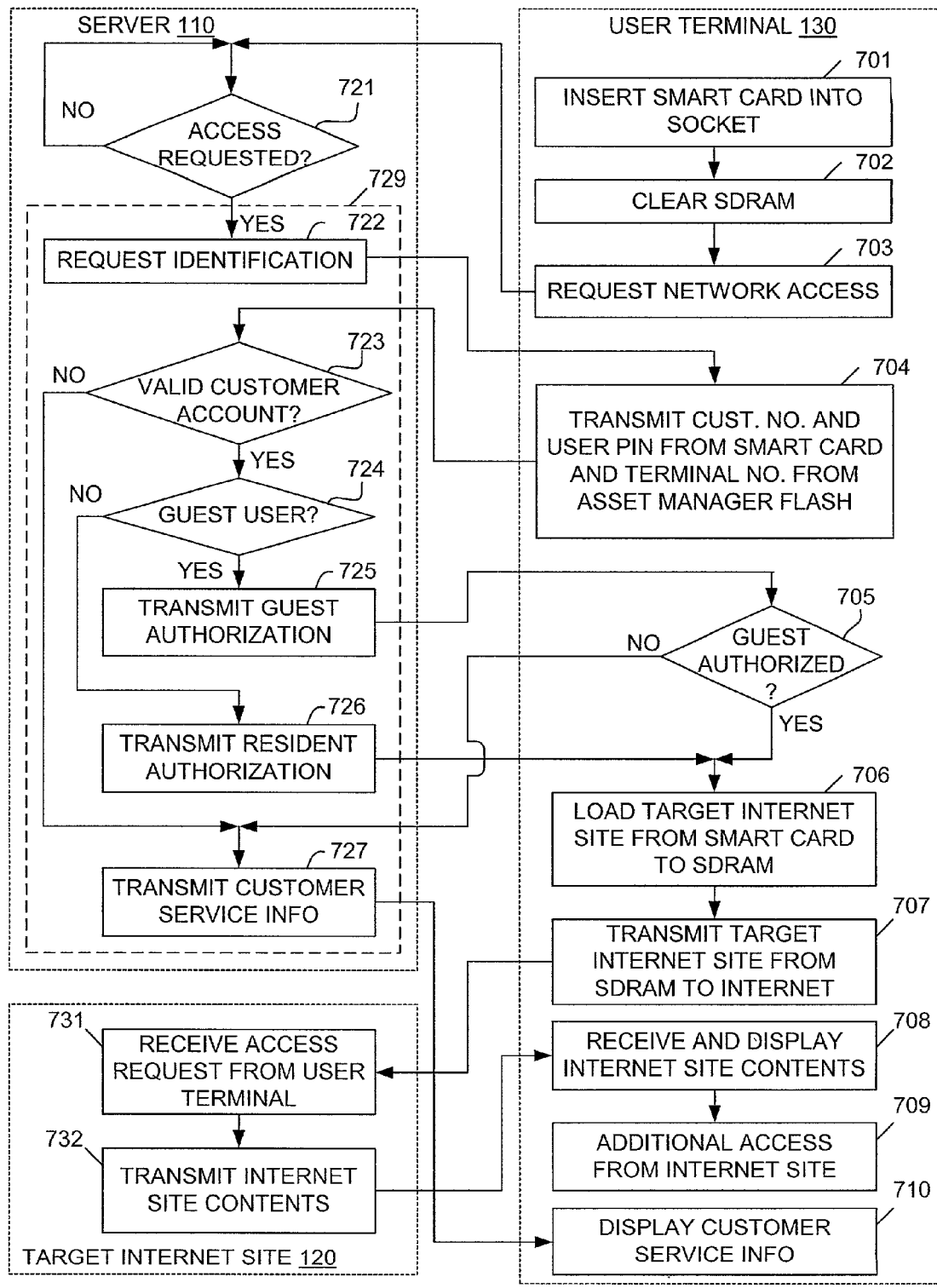
FIGS. 7 and 8 are flow diagrams illustrating the operation of a user terminal, a system server and a target Internet site after the user receives a smart card produced in the flow of FIG. 6.

FIG. 7 is a flow diagram illustrating the operation of user terminal 130, system server 110 and target Internet site 120 in accordance with one embodiment of the present invention. The user (e.g., John Doe) receives a smart card 232 programmed during Step 630. Upon receiving smart card 232, the user may insert the smart card into the smart card socket 215 of set top box 131 (Step 701). Interrupt switch 214 is physically actuated by the insertion of smart card 232 in socket 215. As a result, interrupt switch 214 transmits an interrupt signal to system controller 211, which in turn notifies CPU 210. In response, CPU 210 clears previous authorization and channel table information stored in SDRAM 218 (Step 702). CPU 210 then begins a user authorization process by transmitting a network access request to system server 110 using communication port 217 (Step 703).

System server 110 determines that a network access has been requested in Step 721. Server 110 responds to the network access request transmitted from set-top box 131 by performing an authorization check (Step 729). First, server 110 transmits a request for user and terminal information (Step 722). In response, set-top box 131 retrieves the customer number and user PIN from the inserted smart card 232, and retrieves the box serial number 342 from asset manager flash 222, and transmits this information to system server 110 (Step 704). Because the smart card in the present example belongs to John Doe, the set-top box 131 transmits customer number "123456789" and user number "001" to system server 110. Because the smart card is inserted into John Doe's set-top box 131, a box serial number of "00000001" is transmitted to system server 110.

System server 110 then determines whether the information transmitted during Step 704 corresponds with a current customer account (Step 723). To accomplish this, system server 110 compares the customer number, user PIN and box serial number received from set-top box 131 with the contents of network database 416. If the customer account is not current (e.g., the customer has not paid required periodic fees for access to the network), or if the box serial number of the transmitting set-top box 131 is invalid, then system server 110 transmits customer service information (Step 727), which is displayed by the user terminal 130 (Step 710). In one embodiment, the customer service information describes the reasons for denying the network access request (e.g., delinquent account, unauthorized user terminal). The customer service information may also include a telephone number for the customer to call if there are any additional questions. As described below, the failure of system server 110 to transmit an authorization code to set-top box 131 prevents the target Internet site URL from being retrieved from smart card 232 and written to SDRAM 218, thereby preventing the target Internet site 120 from being accessed by user terminal 130.

In the present example, system server 110 determines that the user information (e.g., customer number and user PIN) received from set-top box 131 matches the first entry of network database 416 (FIG. 4). From this entry of network database 416, system server 110 determines that the status of John Doe's account is current. If system server 110 identifies a current customer account in Step 723, then control passes to Step 724, in which server 110 determines whether the inserted smart card identifies a resident user of the terminal requesting service, or a guest user (Step 724). In one embodiment, this determination is performed by comparing the box serial number received from set-top box 131 with the box serial number stored in network database 416 for the identified customer account. In the present example, system server 110 determines that the box serial number received from set top box 131 ("00000001") matches the box serial number associated with John Doe's account in network database 416 ("00000001"). In this case, a resident user is detected and processing continues to Step 726 in which system server 110 transmits a resident user authorization code to set-top box 131.

If the user is attempting to use his or her smart card in another customer's set-top box, then the user will be allowed to receive authorization as a guest of the other customer's set-top box, as long as the other customer allows such guest access. For example, if John Doe has inserted his smart card in Dan Delay's set-top box, then the box serial number transmitted by the set-top box ("00000002") will not match the box serial number associated with John Doe's account in network database 416 ("00000001"). In this case, system server 110 determines that John Doe is a guest user, and processing continues to Step 725, in which system server 110 transmits a guest user authorization code to set-top box 131. In a variation of the present embodiment, system server 110 will not provide guest authorization unless the status of the customer account associated with set-top box 131 is current. That is, John Doe would not receive a guest authorization code because Dan Delay's user status has expired.

Returning to the right side of FIG. 7, after set-top box 131 transmits the customer number, user PIN and box serial number to server 110 in Step 704, set-top box 131 waits to receive an authorization code from server 110. In one embodiment, if a guest authorization code is received from system server 110, set-top box 131 determines whether guests are authorized (Step 705). This determination process involves checking pre-set flags or information controlled by the owner of set-top box 131, thereby allowing the owner to deny access to guest users. In other embodiments, the guest authorization determination process can be performed before the network access request (Step 703). If guests are not authorized in set-top box 131 (NO branch from Step 705), then system server 110 provides customer service information to the user (Steps 727 and 710).

If guests are authorized (YES branch from Step 705), or if a resident user authorization code is received from server 110 (Step 726), then set-top box 131 completes the initialization process by using the authorization code to retrieve the target Internet site URL 333 from smart card 232, and loading this URL 333 into SDRAM 218 (Step 706). CPU 210 then accesses the target Internet site URL 333 (e.g., "www.store.com/specialoffer") using the target Internet site URL 333. (Steps 707, 731).

In response, target Internet site 120 transmits the target information to user terminal 130 on the Internet (Step 732). User terminal 130 receives and displays the target information received from target Internet site 120 (Step 708). The target information may include a reference to the target Internet site URL 333 (i.e., tell the user that the Internet site being accessed has a URL of "www.store.com/specialoffer"). The target information may also include links to other Internet sites, which may be accessed by the user through input device 133 (Step 709).

The user removes smart card 232 when the session is completed. The physical removal of smart card 232 again actuates interrupt switch 214, thereby transmitting an interrupt signal to CPU 210 via system controller 211. In one embodiment, CPU 210 erases the target Internet site URL 333 from SDRAM 218 upon removal of smart card 232.

In the foregoing manner, target Internet site 120 is able to provide the target information to the user, without having to advertise the target Internet site. The owner of system server 110 is able to derive income by providing the smart cards to the user for target Internet site 120. The user advantageously gains access to the target information without having to learn or remember the address of the target Internet site.

Figure 8:
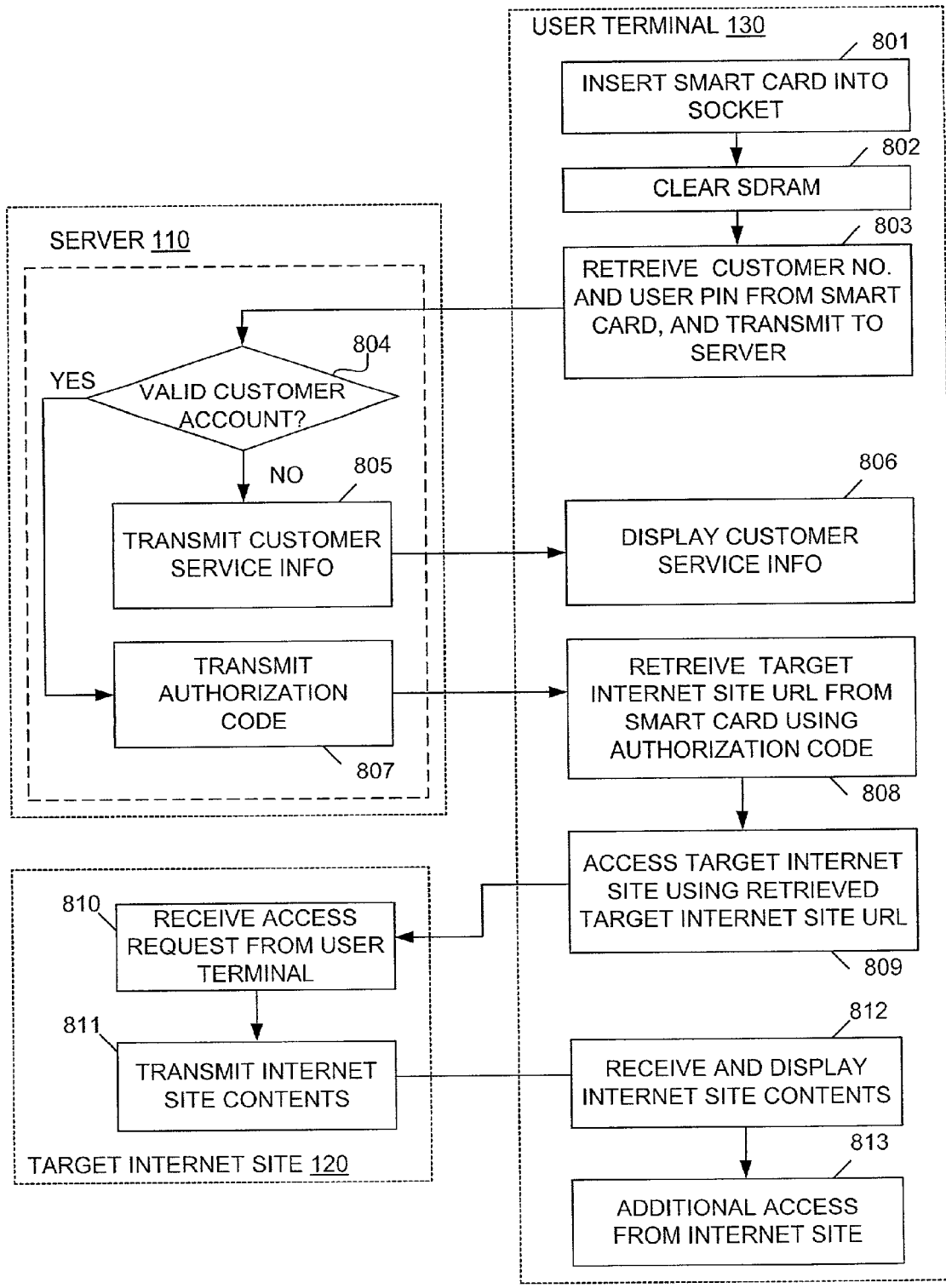

FIG. 8 is a flow diagram illustrating the operation of user terminal 130, system server 110 and target Internet site 120 in accordance with a simplified embodiment of the present invention. Again, the user (e.g., John Doe) receives a smart card 232 programmed during Step 630. Upon receiving smart card 232, the user may insert the smart card into the smart card socket 215 of set top box 131 (Step 801). Again, interrupt switch 214 is actuated by the insertion of smart card 232 in socket 215, thereby causing CPU 210 to clear previous authorization and channel table information stored in SDRAM 218 (Step 802).

CPU 210 then retrieves the customer number 331 and the user PIN 332 from smart card 232, and transmits this information to system server 110 (Step 803). System server 110 compares the customer number 331 and user PIN 332 with network database 416 (FIG. 5) and determines whether customer number 331 and user PIN 332 correspond with a user having a "current" status (Step 804). If system server 110 determines that the customer number 331 and user pin 332 do not match a current record in network database 416, then system server 110 transmits customer service information (Step 805), which is displayed by user terminal 130 (Step 806).

If system server 110 determines that the customer number 331 and user PIN 332 match a current record in network database 416, then system server 110 transmits an authorization code to user terminal 130 (Step 807). User terminal 130 receives the authorization code, which enables CPU 210 to retrieve the target Internet site URL 333 from smart card 232 (Step 808). The target Internet site URL 333 is written to SDRAM 218, and used by set-top box 131 to accesses the target Internet site 120 (Steps 809–810). In response, target Internet site 811 transmits the target information to user terminal 130 (Step 811). User terminal 130 then displays the target information (i.e., the target Internet site content) (Step 812). In certain embodiments, the displayed target information may include additional links that may be accessed by the user (Step 813).

The embodiment described by FIG. 8 allows the user to access the target Internet site 120 from any user terminal, as long as the user's account is current. That is, the embodiment described by FIG. 8 does not treat a guest user any different than a resident user.

Although the present invention has been described in connection with specific embodiments and examples, it is understood that variations to these embodiments and examples would be apparent to one of ordinary skill in the art. Thus, the invention is limited only by the following claims.

The invention claimed is:

1. A method of accessing a target Internet site comprising:
reading authorized user information from a smart card inserted into a user terminal;
transmitting the authorized user information from the user terminal to a server on the Internet;
receiving an authorization code with the user terminal, the authorization code being transmitted by the server in response to the authorized user information;
using the authorization code to retrieve a target Internet address from the smart card, wherein the target Internet address is stored on the smart card such that the user terminal is prevented from retrieving the target Internet address without receiving the authorization code from the server, and wherein the target Internet address corresponds with the target Internet site; and
using the target Internet address retrieved from the smart card to access the target Internet site.

2. The method of claim 1, wherein the authorized user information on the smart card is provided by an owner of the server, and the target Internet address is provided by an owner of the target Internet site.

3. The method of claim 1, further comprising maintaining a database of authorized users in the server.

4. The method of claim 3, further comprising:
comparing the authorized user information with the database of authorized users in the server; and
issuing the authorization code with the server if the authorized user information corresponds with a valid entry in the database of authorized users in the server.

5. The method of claim 4, further comprising transmitting a code identifying the user terminal from the user terminal to the server on the Internet.

6. The method of claim 5, issuing the authorization code further comprises:
issuing a resident authorization code if the valid entry in the database corresponds with the code identifying the user terminal;
issuing a guest authorization code if the valid entry in the database does not correspond with the code identifying the user terminal.

7. The method of claim 1, further comprising transmitting a code identifying the user terminal from the user terminal to the server on the Internet.

8. A user terminal for an Internet access network including a server and a target Internet site, the user terminal comprising:
means for reading authorized user information from a smart card;
means for transmitting the authorized user information to the server;
means for receiving an authorization code from the system server; and
means for retrieving a target Internet address corresponding with the target Internet site from the smart card in response to the authorization code, wherein the target Internet address is stored on the smart card such that said means is prevented from retrieving the target Internet address without first receiving the authorization code from the server; and
means for accessing the target Internet site in response to the retrieved target Internet address.

9. An Internet access network comprising:
a server having a server database that stores authorized user information that identifies authorized users of the Internet access network;
user terminals for enabling the authorized users to access the Internet with support from the server;
a smart card for insertion into the user terminals, the smart card being programmed to store authorized user information for one of the authorized users and a target Internet address associated with a target Internet site, wherein the target Internet address is stored on the smart card such that the user terminals are prevented from retrieving the target Internet address without first receiving authorization from the server;
means for retrieving the authorized user information from the smart card within the user terminal;
means for transmitting the retrieved authorized user information from the user terminal to the server;
means for comparing the authorized user information transmitted from the user terminal to the server with the authorized user information stored in the server database; and
means for authorizing access to the target Internet site if the authorized user information transmitted from the user terminal to the server matches authorized user information stored in the server database.

10. The Internet access network of claim 9, wherein the target Internet site is independent of the server.

11. The Internet access network of claim 9, wherein an owner of the server controls the programming of the smart card.

* * * * *